FIG. I

July 21, 1964 H. HACK 3,141,338
METHOD AND MACHINE FOR BALANCING ROTORS
Filed Jan. 29, 1962 3 Sheets-Sheet 2

United States Patent Office 3,141,338
Patented July 21, 1964

3,141,338
METHOD AND MACHINE FOR
BALANCING ROTORS
Heinrich Hack, Darmstadt, Germany, assignor to Carl Schenck Maschinenfabrik G.m.b.H., Darmstadt, Germany, a corporation of Germany
Filed Jan. 29, 1962, Ser. No. 169,494
Claims priority, application Germany Feb. 1, 1961
7 Claims. (Cl. 73—462)

My invention relates to methods and machines for determining the unbalance of rotating workpieces and has for its general objects to simplify the operations and manipulations to be performed and to shorten the time required for calibrating the balance-analyzing equipment prior to performing a balance-measuring run proper.

The invention is related to those disclosed and claimed in my copending applications Serial No. 137,872, filed September 13, 1961, and Serial No. 69,224, filed November 14, 1960, both assigned to the assignee of the present invention.

In a balancing machine on which the unbalance of a rotating workpiece is to be measured, especially by electrical measuring means, the response or indication of the measuring instrument must be calibrated before an unknown unbalance of a workpiece or a series of similar workpieces can be correctly determined as to magnitude and angular position, usually with reference to predetermined or arbitrarily chosen radial correction plane or location of the workpiece. It is therefore necessary to perform a calibrating run of the balancing machine prior to subjecting a workpiece or sequentially a series of similar workpieces to the balancing run proper. The calibration is performed at a given speed of workpiece rotation after auxiliary unbalance weights of known magnitude and angular position have been attached to the workpiece in the proper reference or correction plane or planes. In this manner, a definite correlation is obtained between the response or indication of the measuring instrument and the known data of the auxiliary calibrating unbalance in the selected reference planes. This empirically determined correlation constitutes the basis for subsequently determining the unknown unbalance of a workpiece by a measuring run during which the instrument indication then caused by the unknown unbalance is indirectly compared with the instrument indication previously determined during the calibrating run for the known unbalance.

All electrically measuring balancing machines heretofore known operate on such an indirectly comparative principle. It is applicable only under the condition that the correlation of the calibrating unbalance intentionally placed in a given reference plane to the instrument indication resulting from that unbalance does not change when passing from the calibrating run to the measuring run. The result of the comparative operation furnishes a measure for the correction, such as the addition or elimination material at a given location of the workpiece, required for eliminating or satisfactorily minimizing the unbalance.

There are balancing machines with vibratorily supported journal means for the rotating workpiece, whose unbalance is measured by determining the vibratory deflections of the journal means during the unbalance measuring run with the aid of vibration-measuring equipment. If in such machines, within the range of measuring speeds, the natural frequency of the vibratory system, consisting essentially of the journal means and of a proportion of the workpiece mass acting upon these journal means, is lower than the natural frequency or spring constant of the vibratory journal support (so-called "low-tuned balancing machines"), then the above-mentioned empirically determined correlation, ascertained during the calibrating run at rotational speeds above the critical speed, is essentially dependent upon the mass and the mass distribution of the workpiece or rotor body employed for the calibrating run. Consequently, the deflection "$a$" of the vibratory workpiece-journal structure during a measuring run is proportional to the unbalance U and inversely proportional to the mass G of the rotating workpiece, in accordance with the equation $$a = \frac{U}{G}$$

In high-tuned balancing machines, i.e., machines in which the natural frequency of the vibratory system is higher than the above-mentioned spring constant, the emipirically found correlation applies with practically sufficient accuracy only in a single measuring range, determined by the mass of the workpiece (rotor) employed for the calibrating run. In high-tuned machines, the above-mentioned correlation is also dependent upon the rotating speed chosen for the calibrating run, this dependency being non-linear.

It is a more specific object of my invention to provide a direct comparative method applicable for static as well as dynamic balancing of rotating workpieces in which the workpiece-journal structure of the balancing machine during the measuring run of the workpiece to be balanced is simultaneously subjected to the action of one or more known unbalances, and the vibratory effects caused by the unknown unbalance to be determined and by the known auxiliary unbalance are simultaneously translated by transducer means into electrical measuring quantities which are additively superimposed upon each other to directly provide the desired indication as to magnitude and angular position of workpiece unbalance by a single machine run. In other words, the just-mentioned object of my invention aims at making each unbalance-measuring run simultaneously operate as a calibrating run, thus doing away with the preliminary calibrating run required in the conventional balancing machines of the electrically measuring type.

For eliminating the necessity of a preceding calibrating run, the method and apparatus according to my above-mentioned copending application Serial No. 69,224 involves imposing during the measuring run proper an oscillatory excitation of known power on the oscillating workpiece holder of the balancing machine simultaneously with the rotor unbalance to be measured. As a result, the measuring run yields a measurable effect (deflection of the journal structure) "$a$" caused by the workpiece unbalance and also an effect $a'$ caused by the known superimposed excitation which are both compared with each other, namely $$a = \frac{U}{G}$$

and $$a' = \frac{E}{G}$$

wherein E denotes the known excitation, for example in mm. g. It follows from the equation $$G = \frac{U}{a} = \frac{E}{a'}$$

that (1) $$U = \frac{a}{a'} \cdot E$$

According to this equation, the value U of the workpiece unbalance is ascertained and expressed independently of the workpiece weight.

When performing a balancing operation in a plurality of reference or correction planes of the rotating workpiece, the weight distribution in the workpiece affects the magnitude of the unbalance-responsive oscillatory deflections at the workpiece bearings. For that reason, more than one workpiece run have heretofore been necessary for preliminary calibration, and the different influence of the unbalance along the workpiece axis upon the oscillation measurement also had to be taken into account. For this purpose, a so-called electric plane-separation network of potentiometric resistors has been used. In order to simplify such plural-plane balancing, my above-mentioned copending application Serial No. 137,872 discloses an improvement according to which as many excitations of known power are employed in the respective reference planes (bearing planes) of the workpiece as are vibration-measuring locations provided. Thus, for determining unbalance of the workpiece in two axially spaced reference planes, the influence UL' of an unbalance UL in the left reference plane upon the right reference plane is found by comparing the influence of a known excitation EL in the left reference plane with the influence EL' of the same excitation upon the right reference plane, namely:

$$\frac{UL}{UL'} = \frac{EL}{EL'}$$

The same applies analogously for the influence UR' of an unbalance UR in the right reference plane, namely:

$$\frac{UR}{UR'} = \frac{ER}{ER'}$$

It follows that (2a) $$UL = UL' \cdot \frac{EL}{EL'}$$

and (2b) $$UR = UR' \cdot \frac{ER}{ER'}.$$

According to both prior disclosures mentioned above, the vibratory reactions of the workpiece-accommodating machine structure resulting from the workpiece unbalance on the one hand and from the superimposed excitation on the other hand are separately measured and require the use of two oscillation sensors or pickups in each reference plane, the two pickups being 90° displaced from each other. This also requires that each workpiece-journalling structure of the balancing machine be oscillatible in two planes (i.e. in two mutually perpendicular directions of the radial reference plane) and that the journalling structures used as the two ends of the workpiece have respective masses as closely equal to each other as feasible. While in one reference plane the vibratory deflections due to unbalance and due to excitation are being measured, it is possible to determine in the other reference plane only the unbalance-responsive deflection by subtracting one measured value from the other; both values can thus be ascertained distinct from each other.

It is a more specific object of the present invention to further improve and simplify unbalance-measuring methods and machines of the type dealt with in my above-mentioned copending applications so as to afford a separate and distinct determination of the respective reactions caused in the workpiece-journalling structure by the unbalance and by the additional excitation respectively, without requiring the journalling structure to be capable of vibrating in more than one direction of a single plane.

Another subsidiary object of my invention is to afford the mentioned mutually distinct determination of unbalance-responsive and excitation-responsive effects with the aid of relatively simple or conventional electrical measuring devices, for example multiplying systems such as wattmeters or Hall generators.

Still another object of my invention is to afford a simple or automatic adjustment of the measuring tolerances within which the method or machinery according to the invention will operate, the adjustment being dependent upon the particular shape or design of the workpiece being tested.

Relating to the last-mentioned object of my invention, the above-presented Equation 1 indicates that the unbalance dimension U is independent of the excitation E. Assuming the excitation E to be constant, the magnitude of U is given by the factor $a/a'$ which may be greater or smaller than unity. For prescribing unbalance tolerances on the basis of any properties of the workpiece, for example differently large workpiece diameters, the excitation can be varied in dependence upon such variable magnitude. In this manner the unbalance tolerances permissible for the workpiece are automatically taken into account. A particularly favorable use of this feature is the classification of tires for automotive vehicles. When such tires come from the molding press they are tested for unbalance and then sorted and marked in accordance with classes of quality based upon ranges of unbalance. In this case, the excitation generator used for the purposes of the invention can be so controlled that it adjusts itself in accordance with the diameter of the particular tire located in the workpiece-holding structure of the balancing machine.

The above-mentioned and further objects, advantages and features of my invention, said features being set forth with particularity in the claims annexed hereto, will be apparent from, and will be described in, the following with reference to the embodiments of balancing equipment illustrated by way of example on the accompanying drawings in which:

Figure 1:
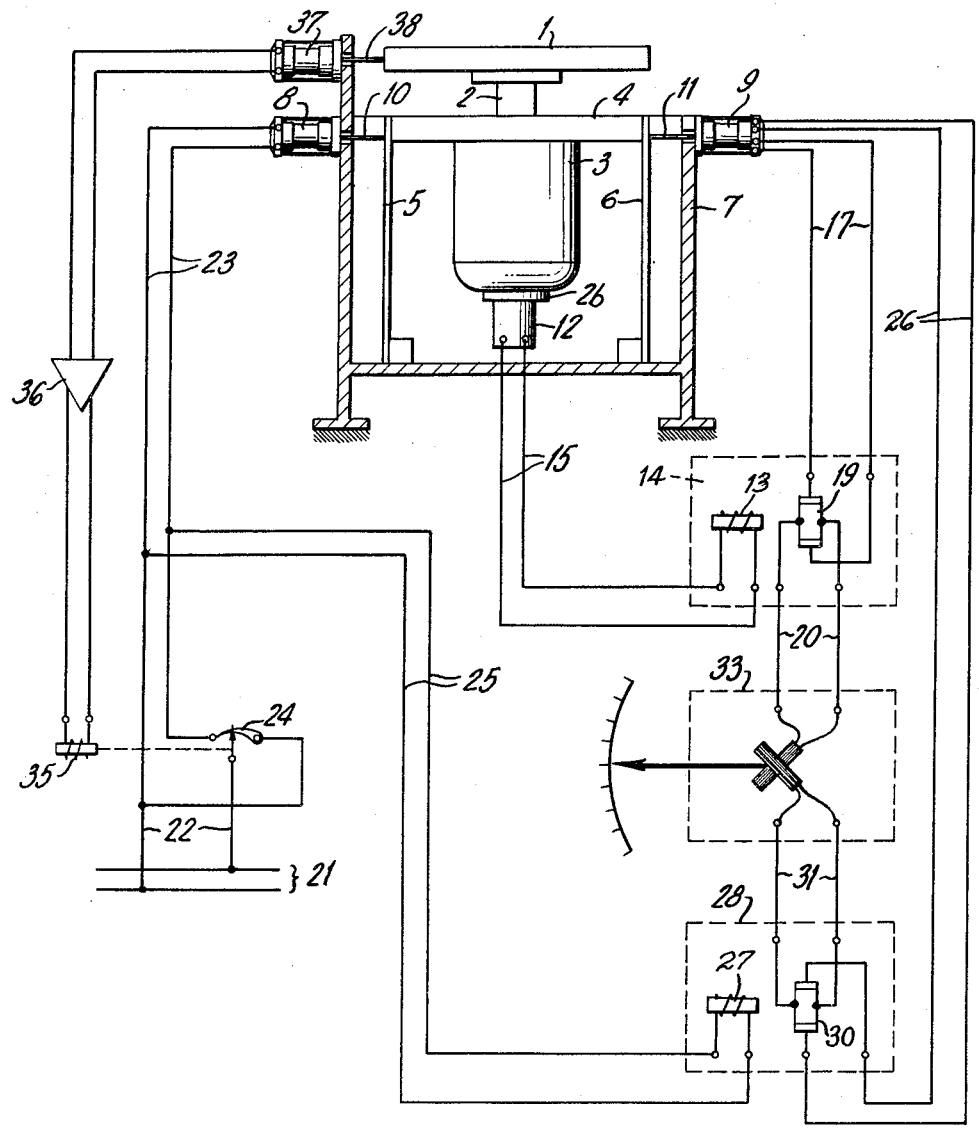
FIG. 1 shows schematically, in front view, a balancing machine with a vertical axis of workpiece rotation for unbalance correction in one plane, together with a schematic electric circuit diagram of the appertaining electrical components.

In the balancing machine illustrated in FIG. 1 the workpiece rotor 1, such as a fly wheel or tire to be balance-corrected in a single reference plane, is mounted on the top end of a vertical shaft 2 driven from an electric motor 3 which is fixed to a rigid workpiece-journalling structure or bridge 4. The bridge 4 is firmly secured to the respective top ends of leaf springs 5 and 6 whose respective planes extend perpendicular to the plane of illustration and whose foot ends are attached to the base portion of a rigid housing or frame structure 7. By virtue of such elastic mounting, the bridge 4 together with the motor 3, the shaft 2 and the workpiece 1 are capable of vibrating in a horizontal direction within the plane of illustration. Firmly mounted on the rigid frame structure 7 of the machine are an electrodynamic exciter 8 and an electrodynamic oscillation pickup 9 on diametrically opposite location so that their despective directions of oscillation are coaxially aligned with the direction in which the journal-bridge structure 4 can vibrate. The exciter 8 has an alternating-current winding (not shown in FIG. 1; see 56a in FIG. 3) acting upon a magnetizable armature which is connected with the bridge 4 by a connecting rod 10 so that the exciter 8 imposes upon the bridge 4 linear vibrations of known frequency and amplitude in the above-mentioned direction when an alternating current is supplied to the exciter 8. The pickup 9 may be of the convential type having a moving coil (not shown in FIG. 1; see 57aa in FIG. 3) connected with the bridge 4 by a sensing rod 11 so that any vibration of the bridge 4 is imparted through rod 11 to the pickup and causes the generation of an alternating pickup voltage in the conventional manner. It will be understood that any other type of electric exciter may be used, as well as any other suitable type of transducer or sensor capable of converting mechanical oscillation into electric voltage.

The lower end 2b of the motor shaft is connected to an auxiliary electric generator 12 which serves as a phase-reference or angle-reference transmitter in the electric balance measuring system. The generator 12 may be of the conventional electrodynamic type to furnish a substantially sinusoidal voltage in synchronism and fixed phase relation to the rotation workpiece. The phase reference generator 12 is connected through leads 15 with the field coil 13 of a Hall generator 14 which, in this embodiment, is employed as a preferred embodiment of an electric multiplying device. The semiconductor Hall plate 19 of Hall generator 14 has its current supply terminals connected by leads 17 with the oscillation pickup 9 to receive voltage therefrom. During rotation of the workpiece 1 the output leads 20 connected to the Hall electrodes of the Hall plate 19 furnish a voltage proportional to the mathematical product of the phase-reference voltage from generator 12 times the vibration-responsive voltage from pickup 9.

Simultaneously, the exciter 8 is energized through leads 22, 23 and through a control resistor 24 from an alternating current source 21, such as a utility line of 110 or 220 volts and 50 or 60 cycles per second. The same line voltage, adjusted by means of the rheostat 24 is impressed through leads 25 upon the field coil 27 of a second Hall generator 28 whose Hall plate 30 is traversed by current supplied through lines 26 by voltage from the oscillation pickup 9. The output leads 31 of the Hall generator 28, attached to the Hall electrodes of plate 30, provide a voltage inversely proportional to the weight of the workpiece.

The two voltages from Hall generators 14 and 28 are compared with each other in a quotient-measuring instrument 33 for example a cross-coil instrument 33 as illustrated. As a result the quotient meter indicates a measuring magnitude corresponding to the unbalance $$U = \frac{a}{a'} \cdot E$$

in accordance with the foregoing Equation 1.

The control rheostat 24 in the current supply connection of the exciter 8 has a displaceable slider controlled by an actuator 35 which is connected through an amplifier 36 with a transducer 37 essentially corresponding to the pickup 9 but responsive to deflection caused by the outer contour of the workpiece 1. The transducer 37 is firmly mounted on the rigid frame structure 7 of the machine and has a sensing rod 38 in engagement with the contour of the workpiece 1 so as to generate in transducer 37 a voltage depending upon the contour shape of the rotating workpiece. This voltage, amplified in amplifier 36, causes the actuator 35 to accordingly control the displacement of the slider in rheostat 24. As a result the oscillatory excitation generated by the exciter 8 does not have constant intensity and amplitude but depends upon the particular shape of the workpiece being tested so that the tolerances, which are dependent upon that shape, are automatically adjusted by the rheostat device 24. For example, when sorting tires for automotive vehicles in accordance with unbalance magnitudes, the prescribed tolerances to be observed determine the commercial classification of the tires. For example, a tolerance within a departure of 0.5% of the tire weight relative to the outer diameter of the tire determines a different classification than the tolerance limit of 0.7%. By virtue of the automatic adjustment of the excitation, the measuring value indicated by instrument 33 is directly dependent upon the diameter of the tire and can therefore be employed for the purpose of classifying the products. This means that, if a tolerance for example of two scale divisions in the indicating instrument is demanded at a given weight of the workpiece, this same two-division tolerance is also maintained for workpieces having a different weight or different diameter or both.

As explained above, it is essential to the performance described that the exciter 8 is operated at a frequency considerably (i.e. filterably) different from the rotation frequency of the workpiece 1 during the measuring run. For example, the measuring run may be performed with a workpiece frequency of 600 r.p.m.(=10 c.p.s.) while the exciter 8 receives alternating current of 60 c.p.s. Of course, different numerical frequency values and a different frequency ratio may be chosen, although it is preferable to keep the two frequencies sufficiently distinct for avoiding the necessity of employing appreciable amounts of filtering equipment in the electric measuring components. The separation of the mechanical vibrations and resulting pickup voltages caused by workpiece-inherent unbalance on the one hand and by the superimposed auxiliary excitation from exciter 8 on the other hand is due to the fact that the electric measuring circuits involve a filtering action which, in the embodiment of FIG. 1, is due to the inherent wattmetric performance of the two Hall generators 14 and 28. As mentioned, a Hall generator is essentially a multiplying device. That is, the output voltage taken from the Hall electrodes of the Hall plate, such as plate 19 in Hall generator 14, is proportional to the vectorial product of the two input currents passing through the Hall plate from the pickup and through the field coil from the phase-reference generator respectively. More specifically, the output voltage is proportional to the product of one input current times the in-phase component of the other input current ($I_1 = \cos \varphi \, I_2$, wherein $I_1$ and $I_2$ are the two input currents and $\cos \varphi$ is the phase displacement between the two currents). This however, applies only to currents of the same frequency, the device being not responsive to currents of respectively different frequencies. Consequently, while the voltage from pickup 9 is not sinusoidal but constitutes a mixture or superposition of component voltages, the Hall generator 14 responds only to the one component voltage from pickup 9 that is due to unbalance-responsive vibration. This is because only this vibration is in synchronism with the reference voltage supplied to the field coil 13 from the phase reference generator 12. On the other hand, the output voltage of Hall generator 28 responds only to voltage from pickup 9 that is caused by the superimposed vibrations originating from the auxiliary exciter 8 and having a frequency different from the rotation frequency of the workpiece 1, because only the latter pickup voltage is in synchronism with the excitation voltage supplied from the alternating-current line 21 to the exciter 8. In this manner the above-mentioned separation of unbalance-responsive reaction and excitation-responsive reaction of the oscillating bridge structure 4 is obtained. The pickup 9 may have two mutually insulated windings in which the two above-mentioned currents for the Hall plates of the two Hall generators are generated, although the two currents may also be taken from a single pickup winding. Each of these pickup currents, of course, has a component resulting from the unbalance-responsive reaction as well as a component resulting from the excitation-responsive reaction, but only one of the two components is effective in each of the respective Hall generators for the reasons explained above.

The indicating scale of the instrument 33 is preferably calibrated directly in terms of the unbalance magnitude to be measured or in terms of the amount of correction necessary for establishing balance, such as the amount of an additional correction weight to be added to the workpiece or the depth of a hole to be drilled into the workpiece. It will be understood that the indicated unbalance magnitude is related to a given angular location of the workpiece, namely the one to which the phase of the voltage from the phase-reference generator 12 is set. For obtaining an indication of the unbalance magnitude in a different angular position of the same workpiece, for example in a radial direction 90° displaced from that of the first measurement, the reference voltage from the generator 12 must be displaced accordingly with respect to the workpiece. This can be done in any of the known ways. For example, the phase shifter may be connected between the reference generator 12 and the Hall generator 14 to displace the reference voltage 90°, or the phase reference generator may be provided with two windings 90° phase displaced from each other to furnish a sine and a cosine current respectively which can be used either selectively in succession or simultaneously, if the electric measuring components are provided in duplicate, for a simultaneous indication of the unbalance magnitudes in two coordinate directions of the correction plane. Since these and other methods and devices are universally known in balancing techniques, they are not illustrated. However the shifting from one angular position to the other can also be effected by turning the stator of the phase reference generator 12 a corresponding angular amount about its axis as is the case with the phase-reference generators 59a to 59b shown in FIGS. 2 and 3 and described hereinafter.

Figure 2:
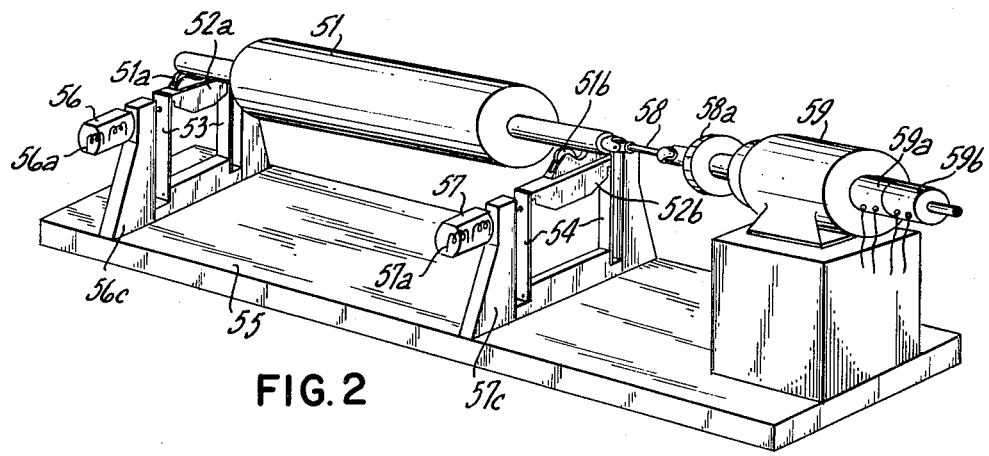
FIG. 2 is a schematic respective view of a balancing machine having a horizontal axis of workpiece rotation for unbalance measurement and correction in more than one plane.

The balancing machine according to FIG. 2 serves for plural-plane (dynamic) balancing. The workpiece 51 is journalled in roller bearings 51a and 51b of journalling bridges 52a and 52b which are supported on pairs of leaf springs 53 and 54 whose lower ends are fastened to the machine bed structure 55. Joined with the bed structure are rigid standards 56c and 57c on which respective transducers 56 and 57 are mounted. Each transducer has a movable rod mechanically coupled with respective bridge 52a, 52b for transmitting vibratory motion from each bridge to the appertaining transducer, and vice versa. That is, in this embodiment each of the transducers 56 and 57 is designed as a combined vibration pickup and vibration exciter. For this purpose, the transducer 56 is provided with two mutually insulated windings 56a and 56aa (FIG. 3), and the transducer 57 is correspondingly provided with two windings 57a and 57aa. When the respective windings 56a and 57a are energized by alternating current they impart corresponding vibrations of the same frequency to the movable transmitting member of the transducer which imparts these movements to the journalling bridge 52a or 52b for the purpose of superimposing thereon the above-mentioned auxiliary excitation. The second winding 56aa or 57aa in each transducer serves to translate mechanical vibrations of the bridge 52a, 52b into corresponding alternating voltage and thus operates as a pickup. This voltage of course is composed of a component caused by the above-mentioned superimposed excitation and of a component due to any unbalance of the workpiece 51 during rotation of the latter.

The workpiece 51 is driven from an electric motor 58 through the universal-link (cardanic) shaft 58 and preferably carries a disc 58a with a peripheral scale of indicia coacting with a fixed reference marker (not shown) and correlated to indicia on the rotationally adjustable stators of two phase-reference generators 59a, 59b. This permits setting the generators to a phase position of known correlation to the angular positions of the workpiece. The phase-reference generators 59a, 59b are mounted on the motor shaft. They consist, for example, of dynamos that furnish respective sinusoidal voltages. The respective stators of the two generators 59a and 59b can be displaced about the axis of rotation by means of a worm gearing actuable by respective crank mechanisms shown at 59c and 59d in FIG. 3. This permits selecting the coordinate directions or angular position relative to which the unbalance is to be measured in the respective reference planes.

Figure 3:
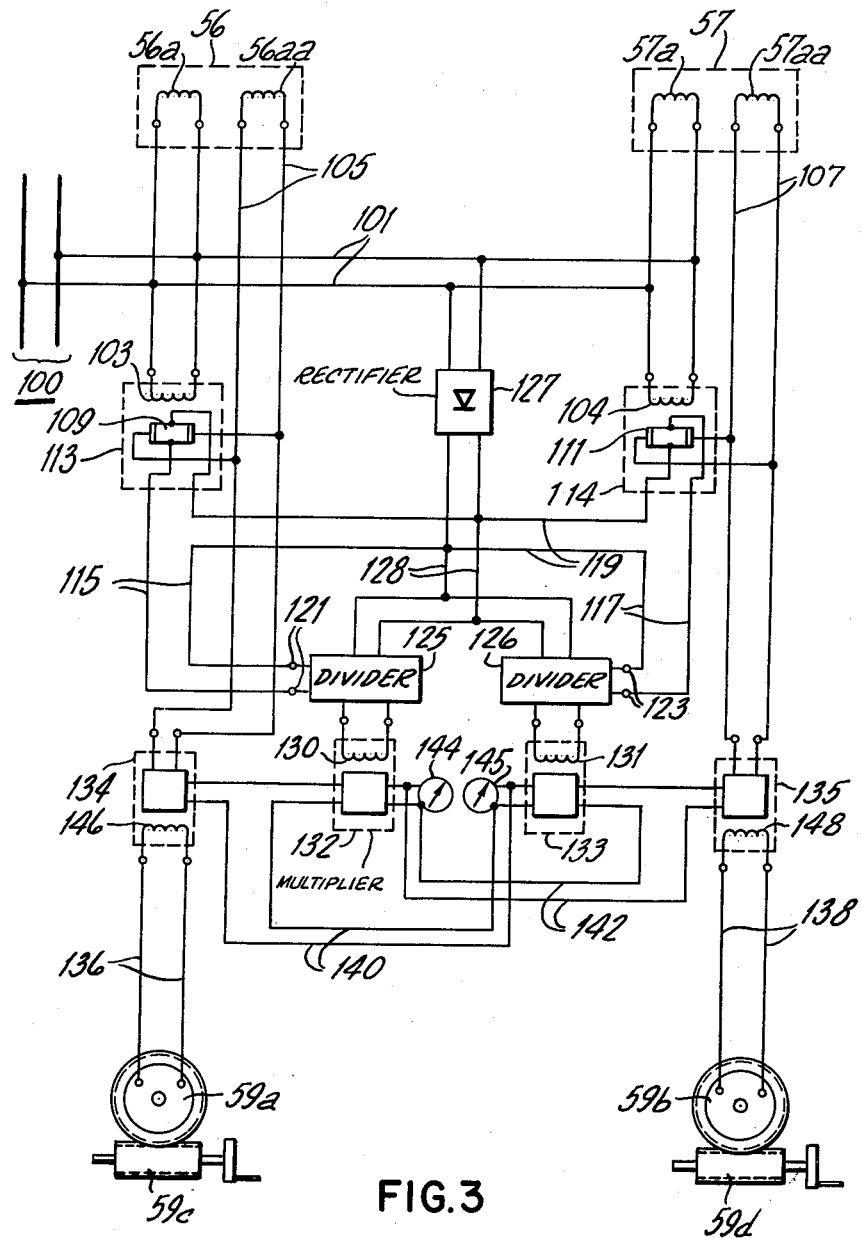
FIG. 3 is an electric circuit diagram relating to the balancing machine according to FIG. 2.

The transducers 56, 57 and the phase-reference generators 59a, 59b form part of an electric measuring network which, according to FIG. 3, also comprises a number of electric computer units, namely multipliers 113, 114, 132, 134, 133, 135 and dividers or ratio computers 125 and 126, as well as indicating or recording instruments 144 and 145.

The excitation windings 56a and 57a of the transducers 56 and 57 are energized by constant alternating voltage of a suitable frequency, for example 50 or 60 c.p.s., through connecting leads 101 from an alternating-current source 100 such as a utility line. Connected to the same alternating voltage are the field windings 103 and 104 of the two multipliers 113 and 114 which in this case consist of Hall generators of the same type as shown at 14 and 28 in FIG. 1. The pickup windings 56aa and 57aa of the two transducers furnish corresponding pickup voltages which drive corresponding alternating currents through leads 105 and 107 and through the respective Hall plates 109, 111 of the same two Hall generators 113 and 114. The output leads 115 and 117 of the respective Hall generators 113 and 114 are connected with each other through leads 119 and are also connected through a rectifier 127 with the alternating-current source 100. As a result, there occurs across the output leads 115 of the Hall generator 113 a voltage which stems from the excitation imposed upon the left journalling bridge 52a and from the influence of the auxiliary excitation at the right bearing bridge 52b, this voltage of leads 115 being thus dependent upon the mass and mass distribution of the vibratory system constituted by the rotating workpiece and the vibrating machine structure on which the workpiece is journalled.

Analogously there occurs across the output leads 117 of the Hall generator 114 a voltage which depends upon the mass and mass distribution of the vibratory system and which stems from the auxiliary excitation superimposed upon the right journalling bridge 52b, as well as from a portion of the auxiliary excitation imposed upon the left bridge 52a. By subtracting from these two output voltage magnitudes the voltage of the rectifier 127, which corresponds to the auxiliary excitation and is supplied through the leads 119, there remains at the input terminals 121 and 123 of the respective ratio-computer units 125 and 126 a voltage proportional only to the influence magnitudes $ER'$ and $EL'$ respectively, both ratio units 125 and 126 being energized by direct current through leads 128.

Although divider or ratio-forming electric computers applicable as components 125 and 126 are known as such and their details are not essential to the invention proper, one applicable embodiment of such a dividing computer will be described below with reference to FIG. 4. However, for understanding the performance of the method and machine according to FIGS. 2 and 3, it suffices to keep in mind that each divider unit 125, 126 has two input circuits, namely one circuit connected to the leads 128 for receiving a constant voltage from rectifier 127, and another input circuit connected to the terminals 121 or 123 for receiving respective product voltages from the multipliers 113 and 114. The two divider units have respective output circuits which furnish a voltage proportional to the ratio of the two voltages impressed upon the two input circuits. These two output circuits of the divider units are connected to the respective field coils 130 and 131 of two further multipliers 132 and 133, also designed as Hall generators according to those described above with reference to multipliers 14 and 28 in FIG. 1.

It will be understood that the two divider units 125 and 126 receive through leads 128 the rectified auxiliary exciter voltage $EL=ER$. Thus the respective field coils 130 and 131 of Hall generators 132 and 133 receive from the divider units respective voltages that are proportional to the ratios $EL/EL'$ and $ER/ER'$. These two terms are each multiplied with the influence magnitudes $UL'$ and $UR'$ in order to separately obtain the respective unbalance components $UL$ and $UR$ respectively. This is done as follows:

The two multipliers 134 and 135, both being identical in design and performance with those described previously, receive input voltage through leads 105 and 107 from the respective pickup windings 56aa and 57aa of the two transducers. The two pickup voltages drive corresponding currents through the Hall plates of the two Hall generators. The voltages comprise components that are indicative of the workpiece unbalance at the frequency of the workpiece rotation, namely as follows. The voltage supplied by leads 105 to Hall generator 134 comprises a component that corresponds to the workpiece unbalance UL, a component that corresponds to the influence magnitude UR' of the unbalance from the right reference plane. Analogously the voltage supplied by leads 107 to Hall generator 135 comprises a component that corresponds to the workpiece unbalance UR at the right reference plane, and also a component that corresponds to the influence UR' stemming from the unbalance of the workpiece at the left correction plane.

The field coils 146 and 148 of respective Hall generators 134 and 135 are connected by leads 136, 138 to the respective phase-reference generators 59a and 59b. Thus the phase-reference voltage becomes multiplied with the composite pickup voltage from transducer windings 56aa and 57aa respectively. As a result of the multiplication in each Hall generator 134 and 135, these Hall generators operate to filter the magnitudes UL and UR' as well as the magnitudes UR and UL' out of the frequency mixture.

By means of connecting leads 140, the magnitude UL is subtracted from the sum $UL+UR'$ coming from the Hall generator 134. Analogously, by means of leads 142 the magnitude UR is subtracted from the sum $UR+UL'$ coming from the Hall generator 135. There remains the magnitude UR' which the Hall generator 132 multiplies with the quotient $ER/ER'$ and thus furnishes the result UR to the measuring instrument 144. Correspondingly, the value UL' is multiplied in Hall generator 133 with the quotient value $EL/EL'$ coming from the divider unit 126, so that the Hall generator 133 furnishes the output magnitude UL to the measuring instrument 145.

Figure 4:
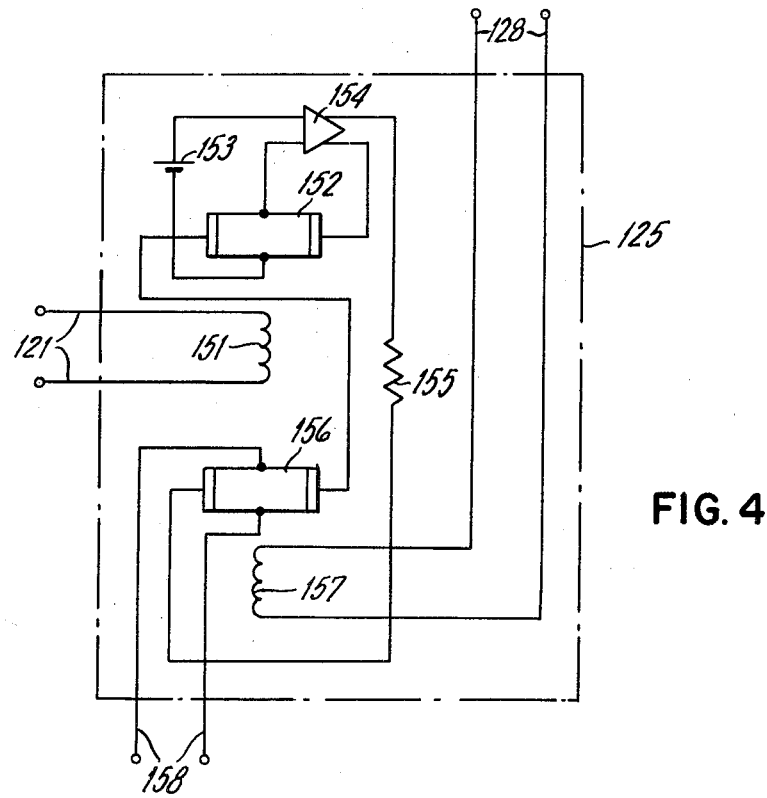
FIG. 4 shows circuit details in a component of the diagram according to FIG. 3.

The divider or quotient-forming units 125 and 126 according to FIG. 3 may be electrically designed as illustrated in FIG. 4 with respect to unit 125. This particular quotient-forming unit corresponds to the one known from U.S. Patent 3,003,698. The device is essentially a combination of two Hall generators. One input signal from leads 121 is applied to a magnetic field coil 151 to act upon a semiconductor Hall plate 152 perpendicular to the field axis. The output taken from the probe or Hall electrodes of plate 152 is connected in series with a constant voltage from an auxiliary source 153, and the resultant voltage is amplified in a regulating amplifier 154. The amplifier output current passes in series through a resistor 155, the Hall plate 152 and through another Hall plate 156 which extends perpendicularly to the field axis of another magnetizing coil 157 energized from the second pair of input leads 128. The current passing through the Hall plate 156 represents the reciprocal value of the voltage applied across the input leads 128, so that the output voltage between the leads 158 is the product of the voltage between leads 121 divided by the voltage between leads 128. For further explanation, reference may be had to the above-mentioned patent.

As a result of the above-described performance, the instrument 144 directly indicates or records the unbalance magnitude in the right reference plane UR and the instrument 145 directly responds to the unbalance magnitude UL in the left reference plane, these results being obtained virtually instaneously as soon as the workpiece has assumed the proper speed of the measuring run, without requiring any preceding calibrating operation nor any change in adjustment if a change is made from one kind or size of workpiece to another. This favorable performance is not predicated upon the use of special elastic mounting or journalling equipment for the workpiece, but, as shown by the embodiments, can be performed with workpiece accommodating structures mounted for vibration in only a single direction of a reference plane.

Further advantages of the invention will appear from the following. Balancing machines that perform a measuring operation at supercritical speeds of the rotating workpiece are characteristic in having sensing means responsive to vibratory deflection, the deflection measuring operation requiring, as a rule, comparatively simple means, the use of electronic amplifiers being unnecessary in many cases. Therefore, the principle of unbalance measurement at supercritical speed has found general acceptance in balancing techniques. Relative to balancing machines that operate below critical speeds, it has been proposed to measure unbalance-responsive forces rather than elastic deflections. This force-measuring principle was given renewed attention in the assumption that it would permit determining the unbalance in a manner independent of the vibrating mass and its distribution, so that it would be unnecessary to perform a calibrating preliminary run for the purpose of the above-mentioned plane separation because the necessary machine adjustments could be made on the basis of the geometrical dimensions of the workpiece. This principle of unbalance measurement, however, has considerable disadvantages. In the first place the high stresses occurring during the measuring run in the bearings for accommodating the workpiece in the balancing machine cause elastic deformation at the counter bearing of the force sensor and thus may falsify the measuring result. Furthermore, the centrifugal force resulting from unbalance is dependent upon the square of the rotating speed so that the speed for calibrating purposes must be kept constant within very narrow limits. For these reasons the force-measuring principle is greatly unfavorable for balancing at variable or adjustable speed required, for example, for balancing programs involving workpieces of different kinds.

In view of these attempts and difficulties, it is another achievement of the present invention that it provides a balancing method as well as an economically and technologically satisfactory balancing machine in which the advantages of deflection-responsive and force-responsive system are combined with each other and the disadvantages of both are eliminated. The principle of supercritical operation can be employed and the unbalance to be determined can be ascertained by comparing measuring results with the aid of an auxiliary vibratory excitation of predetermined power. This eliminates not only the influence of the workpiece weight as well as the mass distribution of the workpiece from the measuring result but also does away with the necessity of preparatory calibrating runs. Furthermore, by making the power of the auxiliary vibratory excitation controllable or regulatable as described above, the method and machine permits taking into account any workpiece constants that are essential with respect to permissible tolerances.

To those skilled in the art of rotor balancing, it will be apparent from the foregoing that my invention permits of a variety of modifications as to mechanical components, electrical components and circuitry, and hence may be given embodiments other than particularly illustrated and described herein, without departing from the essential features of my invention and within the scope of the claims annexed hereto.

I claim:
1. The method of determining unbalance of a rotating workpiece, which comprises
   (a) rotating the workpiece on journal means elastically deflectable in substantially a single plane transverse to the axis of rotation,
   (b) simultaneously imposing on the journal means a vibratory excitation in said same plane and at a known excitation frequency different from the rotation frequency,
   (c) sensing the resultant vibration in a single direc- tion of said plane and translating said vibration into voltage, (d) providing a first reference voltage having said rotation frequency and a second reference voltage having said excitation frequency, (e) electrically multiplying each of said respective reference voltages with said vibration-responsive voltage and thus producing two product voltages, (f) and forming from the two product voltages a magnitude proportional to the ratio of the product voltages and indicative of workpiece unbalance.

2. The method of measuring unbalance of a rotating workpiece, which comprises (a) rotating the workpiece on journal means elastically deflectable in substantially a single direction of a radial plane, (b) simultaneously imposing upon the journal means a linear vibratory excitation of known magnitude in said same plane and substantially in said same direction but at an excitation frequency filterably distinct from the rotation frequency of the rotor, (c) sensing the resultant vibration of said journal means in said direction and translating said vibration into voltage, (d) filtering from said voltage a component due to unbalance-caused vibration, and separately filtering from said voltage another component due to excitation-caused vibration, (e) and electrically combining said two components to obtain a resultant effect indicative of workpiece unbalance.

3. Balancing apparatus comprising supporting structure, journal means for rotatably accommodating a rotor to be tested for unbalance, said journal means being elastically mounted on said structure and vibratorily deflectable relative thereto in a given direction of a radial reference plane, drive means for rotating the rotor in said journal means at a given rotation frequency, exciter means mechanically coupled with said journal means for subjecting the rotor to vibration in superposition to vibration due to unbalance of the rotating rotor, said exciter having an excitation frequency different from said rotation frequency, transducer means mounted on said structure and coupled with said journal means for response to resultant journal vibrations in said direction to produce corresponding transducer voltages, a source of phase reference voltage synchronous with the workpiece rotation, another source of reference voltage in synchronism with said exciter, two multiplier electric systems of which each has two input circuits connected to said transducer and to one of said respective sources and each has an output circuit for providing an output voltage proportional to the product of the transducer voltage times one of said respective reference voltages, and a quotient-forming device connected to said two output circuits to operate in accordance with workpiece unbalance to be determined.

4. In balancing apparatus according to claim 3, said exciter having an electric excitation circuit, alternating-circuit supply means of fixed frequeny to which said excitation circuit is connected to be energized from said supply means, said other source of reference voltage being constituted by said alternating-current supply means.

5. In balancing apparatus according to claim 4, said excitation circuit comprising power control means for adjusting the intensity of vibratory excitation imposed on said journal means.

6. In balancing apparatus according to claim 4, said transducer means comprising a single pickup device having two mutually insulated circuits forming part of said respective transducer input circuits.

7. In balancing apparatus according to claim 4, said transducer means and said exciter forming jointly a single electrodynamic device and having jointly a single coupling member in mechanical connection with said journal means for transmission of vibratory motion between said electrodynamic device and said journal means, said latter device having two windings of which one essentially constitutes said transducer and the other essentially constitutes said exciter.

References Cited in the file of this patent
UNITED STATES PATENTS
3,079,801      Hack _____ Mar. 5, 1963